United States Patent [19]

Dalton

[11] 4,231,888

[45] Nov. 4, 1980

[54] COMPOSITION USED FOR EXTRACTING COPPER FROM AQUEOUS COPPER SALTS

[75] Inventor: Raymond F. Dalton, Manchester, England

[73] Assignee: Imperial Chemical Industries Limited, London, England

[21] Appl. No.: 965,498

[22] Filed: Dec. 1, 1978

Related U.S. Application Data

[62] Division of Ser. No. 756,067, Jan. 3, 1977, Pat. No. 4,142,952.

[30] Foreign Application Priority Data

Jan. 30, 1976 [GB] United Kingdom ............... 3788/76
Jun. 15, 1976 [GB] United Kingdom ............. 24722/76
Oct. 21, 1976 [GB] United Kingdom ............. 43711/76

[51] Int. Cl.$^2$ .................... C22B 15/08; C22B 3/00
[52] U.S. Cl. ................................. 252/182; 423/24; 423/100; 423/139; 252/184
[58] Field of Search ................... 252/182, 184; 75/101 BE; 204/106; 423/24, 100, 139

[56] References Cited

U.S. PATENT DOCUMENTS

| | | | |
|---|---|---|---|
| 3,655,347 | 4/1972 | Mattison et al. | 423/24 |
| 3,725,046 | 4/1973 | Hartlage et al. | 75/101 BE |
| 4,020,105 | 4/1977 | Ackerley et al. | 423/24 |
| 4,020,106 | 4/1977 | Ackerley et al. | 423/24 |
| 4,026,988 | 5/1977 | Wells et al. | 423/24 |
| 4,029,704 | 6/1977 | Anderson | 423/24 |

OTHER PUBLICATIONS

"Solvent Extraction in Copper Metallurgy", Flett Transactions, vol. 83, Mar., 1979, Ins. Mining & Mat. C3068.

*Primary Examiner*—Benjamin R. Padgett
*Assistant Examiner*—Irwin Gluck
*Attorney, Agent, or Firm*—Cushman, Darby & Cushman

[57] ABSTRACT

A process for extracting metal values from aqueous solutions of metal salts which comprises the steps of contacting the aqueous solution with a solution in a water-immiscible organic solvent of one or more o-hydroxyaryloximes containing at least 3 aliphatic or alicyclic carbon atoms and which are strong metal extractants and one or more alkylphenols optionally containing one chlorine atom or one cyano group, separating from the aqueous phase the solvent phase containing metal in the form of a complex with the o-hydroxyaryloxime contacting the solvent phase with an aqueous mineral acid, and separating the solvent phase from the aqueous phase containing metal in the form of a salt with the mineral acid.

6 Claims, No Drawings

COMPOSITION USED FOR EXTRACTING COPPER FROM AQUEOUS COPPER SALTS

This is a division, of application Ser. No. 756,067 filed Jan. 3, 1977 now U.S. Pat. No. 4,142,952.

This invention relates to an improvement in the process for extracting metals from aqueous solutions, especially solutions obtained by leaching ores with acids, using o-hydroxyaryloximes as extracting agents.

It is known to extract metals, especially copper, from aqueous solutions containing the metal in the form of, for example, a salt by contacting the aqueous solution with a solution of an o-hydroxyaryloxime in a water-immiscible organic solvent and then separating the solvent phase loaded with metal, i.e. containing a part of the metal in the form of a chelate compound with the o-hydroxyaryloxime. The metal can then be recovered from the metal loaded solvent phase by stripping with acid solutions followed, for example, by electrowinning.

The reaction leading to the metal chelate compound also forms acid and causes a lowering of the pH. This reaction is reversible and proceeds to an equilibrium point which will favour formation of the chelate compound as the pH is increased. The metal salt-containing aqueous solutions from which metal e.g. copper is to be extracted will frequently be leach liquors obtained by extracting metal ores with acid and will in some cases have a low pH. Since the amount of chelate compound formed at equilibrium is lower as the pH is decreased oly those o-hydroxyaryloximes which have a strong chelating power will be able to achieve a high degree of extraction from those aqueous leach liquors having very low pH or high copper content.

The advantage of high copper extraction shown by these strongly chelating oximes is to some extent offset by the large amount of copper which remains as chelate in the solvent after stripping with acid of convenient strength. While this residual copper as chelate is not lost since it can be recycled to the extraction stage, a reduction in the amount of residual copper chelate would, in the absence of any comparable reduction in the degree of copper extraction from the aqueous solution, afford an improvement in the overall efficiency of the process. It has now been found that the amount of copper removed in these cases from the solvent phase in the stripping stage is significantly increased if the solvent phase contains a phenol of a certain type.

According to the invention there is provided a process for extracting metal values from aqueous solutions of metal salts which comprises the steps of contacting the aqueous solution with a solution in a water-immiscible organic solvent of one or more o-hydroxyaryloximes containing at least 3 aliphatic or alicyclic carbon atoms and which are strong metal extractants as hereinafter defined and one or more alkylphenols optionally containing one chlorine atom or cyano group, separating from the aqueous phase the solvent phase containing metal in the form of a complex with the o-hydroxyaryloxime, contacting the solvent phase with an aqueous mineral acid, and separating the solvent phase from the aqueous phase containing metal in the form of a salt with the mineral acid.

o-Hydroxyaryloximes generally of value for extracting metal values from aqueous solutions of metal salts are well known and include for example alkyl or alkoxysalicylaldoximes as described in Belgian Pat. Nos. 796,835 and 833,774, substituted, e.g. by alkyl or alkoxy groups, o-hydroxyaryl alkyl ketoximes as described in Specifications No. 1,322,532, German Offenlegungsschrift No. 2407200 and Belgian Pat. No. 804,031, o-hydroxyaryl benzyl ketoximes as described in Belgian Pat. No. 804030, and o-hydroxybenzophenone oximes as described in U.S. Pat. Nos. 3,428,449 and 3,655,347. In order to confer adequate solubility of the oxime and its metal derivative in the organic solvents the oximes should contain groups, e.g. alkyl, alkylene or cycloalkyl groups containing at least three carbon atoms and preferably not more than 20 carbon atoms. The solubility is generally further enhanced by the use of mixtures of oximes.

Of the above o-hydroxyaryloximes only those which are strong metal extractants are useful in the process of the invention. These o-hydroxyaryloximes are defined on those which in 0.2 molar solution in an aliphatic hydrocarbon solution when loaded with 50% of the theoretical uptake of copper will be in equilibrium with a 0.1 molar solution of copper as copper perchlorate at a pH less than 1.

As examples of o-hydroxyaryloximes which are strong metal extractants there may be mentioned o-hydroxyaryl ketoximes containing electron withdrawing substituents in the 3-position such as 3-chloro-5-nonylbenzophenone oxime and similar compounds disclosed in U.S. Pat. No. 3,655,347, which in the test for strength given above would be in equilibrium at a pH less than 0.5, other o-hydroxyaryl ketoximes containing electron withdrawing substituents such as halogen substituents in the 3-position as disclosed in Specification No. 1,322,532 or in Belgian Pat. Nos. 804,030 and 804,031, and substituted salicylaldoximes such as alkyl-salicylaldoximes described in Belgian Pat. Nos. 796,835 and 833,774, which in the above test for strength would be in equilibrium at about pH 0.5.

In contrast o-hydroxyaryl ketoximes which are devoid of electron withdrawing substituents in the 3-position, examples which are described in Specification No. 1,322,532, U.S. Pat. No. 3,428,449 and Belgian Pat. Nos. 804,030 and 804,031, in the above test are usually in equilibrium at pH about 1.2 or higher and are not suitable for use in the present invention. The addition of alkyl phenols does improve slightly the metal transfer from these compounds at the strip stage but this advantage is more than counterbalanced by a considerable decrease in the amount of metal transferred to the oxime at the extraction stage and the overall effect is adverse. In the case of the oximes which are strong metal extractants the addition of alkyl phenols as in the process of the invention leads to some decrease in metal transfers at the extraction stage but this disadvantage is materially less than the advantage obtained in increased metal transfer at the strip stage and the overall result of adding the alkylphenol is beneficial.

Particularly useful, owing to their ability to deal with aqueous solutions containing high copper concentrations and their rapid rates of metal transfer, are the alkyl salicylaldoximes especially wherein the alkyl groups are branched chain alkyl groups containing at least five carbon atoms and mixtures of these, for example mixed 5-nonylsalicylaldoximes and mixed 5-heptylsalicylaldoximes, and particularly mixtures of 5-nonylsalicylaldoximes, in which the components of the mixture differ in configuration of the branched chain nonyl group, derived by formylation and oximation from the mixed p-nonylphenols obtained by condensation of phenol with propylene trimer, and mixtures of 5-heptyl-salicylaldoximes, in which the components of the mixture differ in configuration of the heptyl group, similarly derived from phenol-heptylene condensate.

As alkylphenols there may be mentioned any cresol and mixtures of these and especially phenols containing from 3 to 15 alkyl carbon atoms, for example p-tert-butylphenol, p-heptylphenol, 4-amyl-5-methylphenol, 2-chloro-4-nonylphenol, 2-cyano-4-nonylphenol, p-dodecylphenol, m-pentadecylphenol and p-nonylphenol and mixtures of these. Phenols having alkyl groups containing more than 15 carbon atoms are not preferred as they tend to cause emulsification. The preferred phenols contain alkyl groups having from 4 to 12 carbon atoms, especially the mixed p-nonylphenols obtained by condensation of phenol and propylene trimer.

The amount of oxime used will depend upon the concentration of metal salt in the aqueous solution and the plant design. It is preferred however to use from 5 g. to 200 g. of oxime per liter of organic solution. Higher concentrations afford organic phases of too high viscosity for convenient handling and lower concentrations involve the use of unnecessarily large volumes of solvent.

For use with aqueous solutions containing 5 g. or more per liter of metal such as copper it is preferred to use 20 to 200 g. of oxime per liter of organic solution in conjunction with an amount of alkylphenol suitably from 10% to 300% of the weight of the oxime, and especially from 30% to 200%. The effect of the phenol is more marked the higher the concentration of oxime and comparatively lower proportions of of the alkylphenol with respect to the oxime are required to bring about a satisfactory improvement in strip efficiency when operating at high concentrations.

For use with more dilute solutions containing, for example, from 0.5 to 3 g. of metal per liter, oxime solutions containing from 5, and more particularly 10, to 20 g of oxime per liter are preferably used, the amount of alkylphenol being preferably from 2 to 10 times the weight of oxime although higher amounts, such as 20 times, may be used if desired.

The process may be applied to the extraction of any metal capable of forming a lyophilic complex with the oxime, for example cobalt, nickel, vanadium, chromium, zinc, tin, cadmium, gold, silver, mercury and, especially, copper.

The first and second steps of the process may conveniently be carried out by bringing together the aqueous solution and the solution of the oxime in the organic solvent at a suitable temperature, usually ambient temperature, although somewhat higher temperatures may be used if operationally convenient, agitating or otherwise disturbing the mixture of liquids so that the area of the water-solvent interfacial layer is increased in order to promote complex formation and extraction, and then decreasing the agitation or disturbance so that the aqueous and solvent layers settle and can be conveniently separated. The process may be carried out in a batchwise manner or preferably continuously.

The amount of organic solvent to be used may be chosen to suit the volume of aqueous solution to be extracted, the concentration of metals, and the plant available to carry out the process. It is preferred, especially when operating the process continuously, to bring together approximately equal volumes of the organic solution and the aqueous solution.

The conditions, particularly pH, under which first and second steps of the process are carried out are chosen to suit the metal or metals present in the aqueous solution. It is generally desirable that under the chosen conditions any other metals present should not form stable complex compounds with the oxime in order that substantially only the desired metal is extracted from the aqueous solution. Since formation of the complex compound may involve the liberation of acid, it may be necessary to add e.g. alkali during the process to maintain the pH within the desired range in which the metal complex is stable but it is generally preferable to avoid this, especially in a continuously-operated process. The process of the invention is especially suitable for use with copper since this metal forms a complex with o-hydroxyaryloximes which is stable at low pH values and by operating at pH below 3 copper can be extracted substantially free from iron, cobalt and nickel.

As organic solvents there may be used any mobile organic solvent or mixture of solvents which is immiscible with water and, under the pH conditions used, inert to water, to the metal, and to the oxime, especially aliphatic, alicyclic acid and aromatic hydrocarbons and mixtures of any of these particularly mixtures which have little or no aromatic hydrocarbon component, and halogenated particularly chlorinated hydrocarbons including, as solvents more dense than water, highly halogenated hydrocarbons such as perchloroethylene, trichloroethane, trichloroethylene and chloroform.

The third and fourth steps of the process may conveniently be carried out by bringing together the metal-bearing solution of the oxime in the organic solvent, obtained from the second stage of the process, and an aqueous solution of a mineral acid at a suitable temperature, usually ambient temperature, although somewhat higher temperatures may be used if operationally convenient, agitating or otherwise disturbing the mixture of liquids so that the area of the aqueous-solvent interfacial layer is increased in order to promote decomposition of the complex and recovery of the metal and then decreasing the agitation or disturbance so that the aqueous and solvent layer settle and then separating the layers. Suitable relative volumes of aqueous and organic phase are those conventionally used in metal extraction processes for example 1:1. The process may be carried out in a batchwise manner or preferably continuously. The stripped organic layer, containing regenerated oxime, alkylphenol and some residual copper may be re-used in the first step of the process. The aqueous layer containing metal salt may be treated in any conventional manner, especially by electrolysis, to provide the metal.

The mineral acid is preferably sulphuric acid, suitable strengths being from 100 to 250 g. per liter. After removal of a convenient part of the metal by electrolysis the recovered aqueous acid, containing residual metal salt, may be re-used in the third step of the process.

If desired, other ligands may be used, in addition to the oximes and other compounds, such as conditioners, for example long chain aliphatic alcohols such as capryl alcohol, isodecanol, tridecyl alcohol or 2-ethylhexanol, may also be present, suitably in amounts of from 0.5 to 10% by weight of the organic solvent.

The addition of anionic surface active agents such as organic sulphonic acids or acid phosphoric esters is sometimes desirable in order to increase the rate of complex formation and transfer of metal values between the aqueous and organic phases.

Mixtures of o-hydroxyaryloximes and alkylphenols, obtained for example by admixture of the components in any convenient manner, suitable for use in the process of the invention when dissolved in water-immiscible organic solvents, and solutions of such mixtures in water-immiscible organic solvents are also features of the invention. Such solutions may be of suitable strength for use in the process of the invention or, for convenience, for storage or transport, may be more concentrated and require dilution before use.

The invention is illustrated but not limited by the following Examples in which all parts and percentages are by weight unless otherwise specified.

EXAMPLE 1

20 Parts of a solution containing 200 g. per liter of 5-nonylsalicyaldoxime (prepared as described in Belgian Pat. No. 796,835) in Escaid 100 (an 80% aliphatic kerosene-type solvent) was stirred vigorously at 20° C. with 40 parts of an aqueous solution containing 15 g. per liter of copper as copper sulphate and sulphuric acid to bring the pH to 2.0. After 15 minutes the stirring was stopped, the phases allowed to settle and the solvent phase removed and analysed for copper.

15 parts of the solvent phase were then stirred vigorously for 15 minutes with 50 parts of an aqueous strip solution containing 30 g. per liter of copper as sulphate and 150 g. per liter of sulphuric acid. The phases were allowed to settle and the organic phase analysed for copper.

The results showed that the solvent phase after the extraction stage contained 22.02 g. per liter of copper and after stripping contained 15.60 g. per liter of copper indicating a recovery of copper of 6.42 g. per liter of oxime solution used.

To demonstrate the improvement obtained by the process of the invention the above procedure was repeated using an Escaid solution containing also 100 g per liter of p-nonylphenol.

The solvent phase after extraction contained 21.10 g per liter of copper and after strip 10.99 g. per liter of copper indicating a recovery of copper of 10.11 g. per liter of oxime solution, and an increase of 57% in the amount of copper recovered per liter of oxime solution used.

EXAMPLE 2

The procedure of Example 1 was repeated using in the extraction stage 1 part of an Escaid 100 solution containing 50 g per liter of 5-nonylsalicylaldoxime and, when appropriate, 50 g per liter of p-nonylphenol and 2 parts of an aqueous solution at pH 2.0 containing 3.0 g per liter of copper, and in the strip stage 1 part of the loaded organic phase and 1 part of the strip solution used in Example 1.

The results were as follows:

In absense of nonylphenol the solvent phase contained 5.34 g. per liter of copper after extraction and 3.40 g. per liter after strip, indicating 1.94 g. per liter recovery of copper.

In presence of nonylphenol the copper contents were 5.00 and 2.26 g per liter respectively, indicating a copper recovery of 2.74 g. per liter, this being an increase of 41% over the recovery in absence of nonylphenol.

EXAMPLE 3

The procedure of Example 2 was repeated replacing the 5-nonylsalicylaldoxime with 64.4 g. per liter (a corresponding molar quantity) of 5-nonyl-2-hydroxy-benzophenone oxime (U.S. Pat. No. 3,428,449).

The results were as follows:

In absence of nonylphenol the solvent phase contained 4.00 g per liter of copper after extraction and 0.28 g. per liter after strip, indicating a copper recovery of 3.72 g. per liter.

In presence of nonylphenol the copper contents were 3.52 and 0.14 g per liter respectively, indicating a copper recovery of 3.38 g per liter, and demonstrating that with this ketoxime the addition of nonylphenol has an adverse effect.

EXAMPLE 4

The procedure of Example 2 was repeated replacing the 5-nonylsalicylaldoxime with 71 g per liter (a corresponding molar quantity), of 2-hydroxy-3-chloro-5-nonylbenzophenone oxime (U.S. Pat. No. 3,655,347).

The results were as follows:

In absence of nonylphenol the solvent phase contained 4.80 g. per liter of copper after extraction and 4.04 g per liter after strip, indicating a copper recovery of 0.76 g. per liter.

In presence of nonylphenol the copper contents were 4.73 and 3.745 g. per liter respectively indicating a copper recovery of 0.985 g per liter.

2-hydroxy-3-chloro-5-nonylbenzophenone oxime is a strong metal extractant as defined hereinbefore and these results demonstrate that with this ketoxime the addition of nonylphenol has a beneficial effect of increasing the copper recovery under the above conditions by 30%.

EXAMPLE 5

Solutions of Escaid 100 were prepared containing 50 g. per liter of 5-nonylsalicylaldoxime and amounts (equimolar) of alkylphenol as listed below. The solutions were each contacted with aqueous copper sulphate solutions until loaded with 5.4 g. per liter of copper. 1 part of each of the loaded solutions were then stirred vigorously until equilibrium had been established with 0.25 parts of the aqueous strip solution used in Example 1, and the solvent phase then separated and analysed for copper content.

The results were as follows:

| Phenol | Concentration of phenol (g. per liter) | Copper content of stripped solvent phase (g. per liter) |
|---|---|---|
| none | — | 3.59 |
| m-pentadecylphenol | 57.8 | 2.92 |
| 2-methyl-4-nonylphenol | 44.5 | 3.15 |
| p-tert-butylphenol | 28.5 | 2.94 |
| 2-chloro-4-nonylphenol | 48.3 | 2.81 |
| p-nonyl phenol | 41.8 | 2.84 |

EXAMPLE 6

An extractant solution was prepared containing 15 g. of 5-nonylsalicylaldoxime (prepared as described in Belgian Pat. No. 796,835) and 45 g. of 4-nonylphenol per liter in Escaid 100 (an 80% aliphatic kerosene type solvent). 30 Parts by volume of this solution were contacted by vigorous stirring for 15 minutes at 25° C. with 60 parts of an aqueous solution containing 1.0 g. per liter of copper as the sulphate at pH 2.0 so as to establish an equilibrium distribution of the copper between both phases. The phases were allowed to settle and the organic phase analysed for copper.

Part of the copper containing solvent phase was then 'stripped' by vigorous stirring with an equal volume of an aqueous solution containing 150 g. per liter of sulphuric acid and 30 g. per liter of copper as sulphate, such a solution being typical of the spent electrolyte from an electrolytic process for the final recovery of copper. The phases were allowed to settle and the organic phase analysed for copper.

The solvent phase after extraction contained 1.49 g. per liter of copper and after stripping contained 0.42 g. per liter of copper, indicating a recovery of copper of 1.07 g. per liter of oxime/nonylphenol extractant solution.

To demonstrate the improvement obgained by the process of the invention described, the above procedure was repeated using an Escaid 100 solution containing 15 g. per liter of 5-nonylsalicylaldoxime, but no nonylphenol. Under these conditions the solvent phase was found to contain 1.58 g. per liter of copper after the extraction stage, and 0.78 g. per liter of copper after the strip stage, giving a copper recovery of only 0.80 g. per liter of oxime solution.

EXAMPLE 7

Various volume ratios of an extractant solution containing 15 g. per liter of 5-nonylsalicylaldoxime and 45 g. per liter of 4-nonylphenol in Escaid 100, and an aqueous solution containing 1.0 g. per liter of copper as sulphate at pH 2.0 were equilibrated by vigorous stirring for 15 minutes at 25° C. The phases were allowed to settle and each analysed for copper to give the copper distribution. The results were as follows:

| Ratio of Extract/Aqueous volumes | 3:1 | 2:1 | 1:1 | 1:1.5 | 1:2 | 1:3 | 1:4 | 1:6 |
|---|---|---|---|---|---|---|---|---|
| Copper in Organic phase g/l. | 0.34 | 0.50 | 0.98 | 1.33 | 1.49 | 1.59 | 1.64 | 1.65 |
| Copper in aqueous phase g/l. | — | — | 0.04 | 0.13 | 0.26 | 0.47 | 0.59 | 0.73 |

EXAMPLE 8

An extractant solution prepared as in Example 7 was contacted with an aqueous copper solution until loaded to 1.77 g. per liter of copper. Portions of this loaded solution were then vigorously stirred at various volume ratios with an aqueous strip solution containing 150 g. per liter of sulphuric acid and 30 g. per liter of copper as sulphate, to establish equilibrium. The phases were allowed to settle and each analysed for copper content. The results were as follows:

| Ratio of Extractant/strip solution volumes | 1:1 | 2:1 | 3:1 | 5:1 | 7:1 | 9:1 | 15:1 |
|---|---|---|---|---|---|---|---|
| Copper in Organic phase g/l. | 0.42 | 0.44 | 0.46 | 0.49 | 0.53 | 0.56 | 0.62 |
| Copper in Aqueous phase g/l. | 31.5 | 32.9 | 34.2 | 36.7 | 39.0 | 41.8 | 46.8 |

EXAMPLE 9

One part by volume of an Escaid 100 solution containing 50 g per liter of 5-nonylsalicylaldoxime and 50 g per liter of p-cresol was stirred vigorously with two parts of an aqueous solution containing 3.0 g per liter of copper as the sulphate at pH 2.0. After 15 minutes the stirring was stopped, the two phases allowed to separate and the organic phase removed and analysed for copper.

One part of the copper loaded organic phase from the above experiment was then contacted with two parts by volume of an aqueous acid strip solution containing 150 g per liter of sulphuric acid and 30 g per liter of copper as the sulphate. After 15 minutes the stirring was stopped, the phases allowed to separate, and again a portion of the organic phase analysed for copper.

The copper contents of the loaded and stripped organic solutions were 5.29 and 2.34 g per liter respectively indicating a copper transfer by the reagent of 2.95 g per liter. In the absence of p-cresol the loaded solvent phase contained 5.34 g per liter of copper, and after stripping 3.40 g per liter indicating a copper transfer of only 1.94 g per liter. The addition of p-cresol has made an improvement in the copper transfer of 52%.

EXAMPLE 10

The procedure of Example 9 was repeated replacing the p-cresol by 2-cyano-4-nonylphenol. The results were as follows:
Copper in loaded organic phase=4.37 g per liter
Copper in stripped organic phase=1.79 g per liter
Copper transferred by extractant solution=2.58 g per liter This is an improvement in the amount of copper transferred of 43% compared to that when no phenolic compound is added.

EXAMPLE 11

The procedure of Example 2 was repeated but replacing the 5-nonylsalicylaldoxime by 5-heptylsalicylaldoxime. The results were as follows:
5.55 g per liter of copper after the extraction stage, and
3.80 g per liter after the strip stage, indicating a recovery of 1.75 g per liter of copper.

In presence of nonylphenol the solvent phase contained
5.27 g per liter of copper after extraction, and
2.64 g per liter of copper after strip, indicating a copper recovery of 2.63 g per liter, this being an increase of 50% over the recovery in absence of nonylphenol.

I claim:

1. A composition for use in extracting copper values from aqueous solutions of copper salts, said composition comprising (1) o-hydroxyaryloximes selected from the group consisting of a mixture of 5-nonylsalicylaldoximes and a mixture of 5-heptylsalicylaldoximes and (2) a mixture of p-nonylphenols, the amount of (2) being in the range of 0.1 to 20 times the weight of (1), said composition being capable of permitting greater overall copper recovery in a process involving contacting the aqueous solution of copper salts with a solution of said composition in a water-immiscible organic solvent, separating from the aqueous phase the solvent phase containing copper in the form of a complex with the indicated oxime mixture, contacting the solvent phase with an aqueous mineral acid, and separating the solvent phase from the aqueous phase containing copper in the form of a salt with the mineral acid.

2. The composition of claim 1 in solution in a water-immiscible organic solvent.

3. The composition of claim 2 wherein the water immiscible organic solvent contains from 5 to 200 g of o-hydroxyaryloxime per liter.

4. The composition of claim 3 wherein the water-immiscible organic solvent contains from 5 to 20 g of o-hydroxyaryloxime per liter and alkyl phenol in amount from 2 to 20 times the weight of o-hydroxyaryloxime.

5. The composition of claim 4 wherein the water-immiscible organic solvent contains from 20 to 200 g of o-hydroxyarylketoxime per liter and alkylphenol in amount from 0.1 to 3 times the weight of o-hydroxyaryloxime.

6. The composition of claim 5 wherein the solvent is a hydrocarbon.

* * * * *